(12) United States Patent
Krishnamurthy et al.

(10) Patent No.: US 11,165,854 B1
(45) Date of Patent: Nov. 2, 2021

(54) SYSTEM AND METHOD FOR LARGE SCALE SCREEN CAPTURE ACROSS GLOBAL DATA CENTER DEPLOYMENTS

(71) Applicant: JPMorgan Chase Bank, N.A., New York, NY (US)

(72) Inventors: Ramesh Krishnamurthy, Prosper, TX (US); Ricky Hei Wong Chan, Woodside, NY (US); Vijaya Basker Balakrishnan, Coppell, TX (US); Ross S. Indyke, New York, NY (US); Renfei Zhang, Plano, TX (US); Kanishka Hettiarachchi, Chatham, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/855,079

(22) Filed: Apr. 22, 2020

(51) Int. Cl.
*H01L 21/78* (2006.01)
*H04L 29/08* (2006.01)
*H04L 29/06* (2006.01)
*H04L 12/58* (2006.01)

(52) U.S. Cl.
CPC ............. *H04L 67/10* (2013.01); *H04L 51/04* (2013.01); *H04L 63/08* (2013.01); *H04L 67/02* (2013.01); *H04L 67/14* (2013.01)

(58) Field of Classification Search
CPC ......... H04L 67/10; H04L 67/14; H04L 63/08; H04L 67/02; H04L 51/04

USPC .......................................................... 709/219
See application file for complete search history.

(56) References Cited

U.S. PATENT DOCUMENTS

| | | | |
|---|---|---|---|
| 9,912,676 B1* | 3/2018 | Fieldman | H04W 12/06 |
| 2002/0144010 A1* | 10/2002 | Younis | G06F 9/546 |
| | | | 719/314 |
| 2007/0083813 A1* | 4/2007 | Lui | G06F 11/3636 |
| | | | 715/709 |
| 2018/0007099 A1* | 1/2018 | Ein-Gil | G06F 9/468 |
| 2018/0101297 A1* | 4/2018 | Yang | G06F 3/0482 |
| 2018/0219976 A1* | 8/2018 | Decenzo | H04L 67/42 |
| 2018/0239349 A1* | 8/2018 | Rasmussen | B60H 1/00735 |
| 2018/0367483 A1* | 12/2018 | Rodriguez | H04L 65/60 |
| 2019/0279520 A1* | 9/2019 | Wilson | G09B 19/003 |
| 2020/0075040 A1* | 3/2020 | Provost | G06N 3/08 |
| 2020/0127988 A1* | 4/2020 | Bradley | H04W 8/005 |

* cited by examiner

*Primary Examiner* — Tesfay Yohannes
(74) *Attorney, Agent, or Firm* — Hunton Andrews Kurth LLP

(57) ABSTRACT

An embodiment of the present invention may be directed to large scale screen capturing on operating systems across global data center deployments. The system performs monitoring and recording activities, reporting and auditing the activities and further implementing an autonomous (agent-less) deployment model. The system may orchestrate a number of agents to execute on an asynchronous basis to capture and aggregate screen data as well as identify associated metadata in real time. The system may also publish the aggregated screen data.

16 Claims, 7 Drawing Sheets

| Activities | | | | | | | |
|---|---|---|---|---|---|---|---|
| Applications | | | | | | | |

Activities  510

| Period: | ⦿Last [1] [Months ▼] ○Between [02/26/2020] To [03/26/2020] | | | | | | 🖶 Print |
|---|---|---|---|---|---|---|---|
| Login: | [User1.entityA ▼] 👤 User statistics  🔍 Search | | | | | | |
| Filter by endpoint: | [All ▼] | | | | | | |

1-9 of 9    Items per page  [20 ▼]   520

| Session Duration | Login | User | Endpoint Name | Client Name | Slides | Video |
|---|---|---|---|---|---|---|
| 3/26/2020 | | | | | | |
| ˅ 05:09 PM – 05:15 PM | 700005 | n/a | ⊞ ABC00037234 | (local) | 86 | 👁 |
| ˅ 11:53 AM-01:06 PM | 700005 | n/a | ⊞ ABC00037234 | (local) | 76 | ▫ |
| 3/11/2020 | | | | | | |
| ˅ 06:58 PM-07:07 PM | 700005 | n/a | ⊞ ABC00037234 | (local) | 66 | ▫ |
| 3/5/2020 | | | | | | |
| ˅ 05:21 PM-05:31 PM | 700005 | n/a | ⊞ ABC00037234 | 1xx.1xx.3x.2xx | 54 | ▫ |
| ˅ 05:10 PM-05:16 PM | 700005 | n/a | ⊞ ABC00030796 | 1xx.1xx.3x.2xx | 194 | ▫ |
| ˅ 04:45 PM-05:02 PM | 700005 | n/a | ⊞ ABC00030796 | (local) | 3 | ▫ |
| ˅ 01:23 PM-01:43 PM | 700005 | n/a | ⊞ ABC00037234 | (local) | 119 | ▫ |
| 2/28/2020 | | | | | | |
| ˅ 06:34 PM-07:03 PM | 700005 | n/a | ⊞ ABC00037234 | (local) | 55 | ▫ |
| ˅ 12:18 PM-01:33 PM | 700005 | n/a | ⊞ ABC00037234 | (local) | 16 | ▫ |

Latest Sessions
ABC000... .000035
ABC0002... 444480
ABC0002... 555556
ABC000... 888660
ABC000... 646464
ABC0003...444406
ABC0003... 888834
ABC000... 777752
ABC0002... 111128
BCD0000... 222218

SYSTEM AND METHOD FOR LARGE SCALE SCREEN CAPTURE ACROSS GLOBAL DATA CENTER DEPLOYMENTS

FIELD OF THE INVENTION

The invention relates generally to a system and method for large scale screen capturing on operating systems across global data center deployments.

BACKGROUND OF THE INVENTION

Currently, most global entities lack tools to monitor, report and audit log on sessions across platforms and data centers. Third party vendors generally require a burdensome paper trail and demand increased costs. Depending on approval rate and workflow, third party solutions could take years to complete and would require installation on individual servers. Deployment on each server would also generate significant amounts of capture data that would also require additional bandwidth from backend systems to store and manage the data. For an entity with tens of thousands of servers, this is not a viable solution. In addition, due to the licensing cost and IT maintenance cost, such third party solutions would not be feasible and scalable on all servers and data centers for a large global entity.

These and other drawbacks exist.

SUMMARY OF THE INVENTION

According to one embodiment, the invention relates to a system that implements large scale screen capturing across global data center deployments. The system comprises: a scheduler service that orchestrates a set of agents; and the set of agents, each agent executing an application at a predetermined interval, wherein the set of agents are configured to perform the steps of: capturing screen data in real-time from a corresponding set of servers in communication with a jump host server wherein the screen data corresponds to a unique identifier; identifying metadata associated with the screen data, wherein the metadata indicates logon details; aggregating, via a centralized backend event system, the screen data; publishing the data to a messaging queue; and in response to an authenticated request, providing the published data from the messaging queue via a playback platform.

According to another embodiment, the invention relates to a method that implements large scale screen capturing across global data center deployments. The method comprises the steps of: executing a scheduler service that orchestrates a set of agents; the set of agents, each agent executing an application at a predetermined interval; capturing screen data in real-time from a corresponding set of servers in communication with a jump host server wherein the screen data corresponds to a unique identifier; identifying metadata associated with the screen data, wherein the metadata indicates logon details; aggregating, via a centralized backend event system, the screen data; publishing the data to a messaging queue; and in response to an authenticated request, providing the published data via a playback platform.

The system may be implemented as a specially programmed computer system comprising one or more computer processors, interactive interfaces, electronic storage devices, and networks. The computer implemented system and method described herein provide unique advantages to managers, compliance teams, financial institutions and other entities, according to various embodiments of the invention. An embodiment of the present invention is directed to providing screen capture for remote desktop protocol sessions. For example, an entity may have tens of thousands of servers globally. An embodiment of the present invention seeks to capture logon activity through large scale recording so that any activity performed by a user accessing the system, even globally, may be automatically collected, recorded and tagged. An embodiment of the present invention may be directed to monitoring and recording activities, reporting and auditing the activities and further implementing an autonomous (agentless) deployment model.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 5 is an exemplary user interface, according to an embodiment of the present invention.

FIG. 6 is an exemplary user interface, according to an embodiment of the present invention.

DETAILED DESCRIPTION OF THE PREFERRED EMBODIMENT(S)

Figure 1:
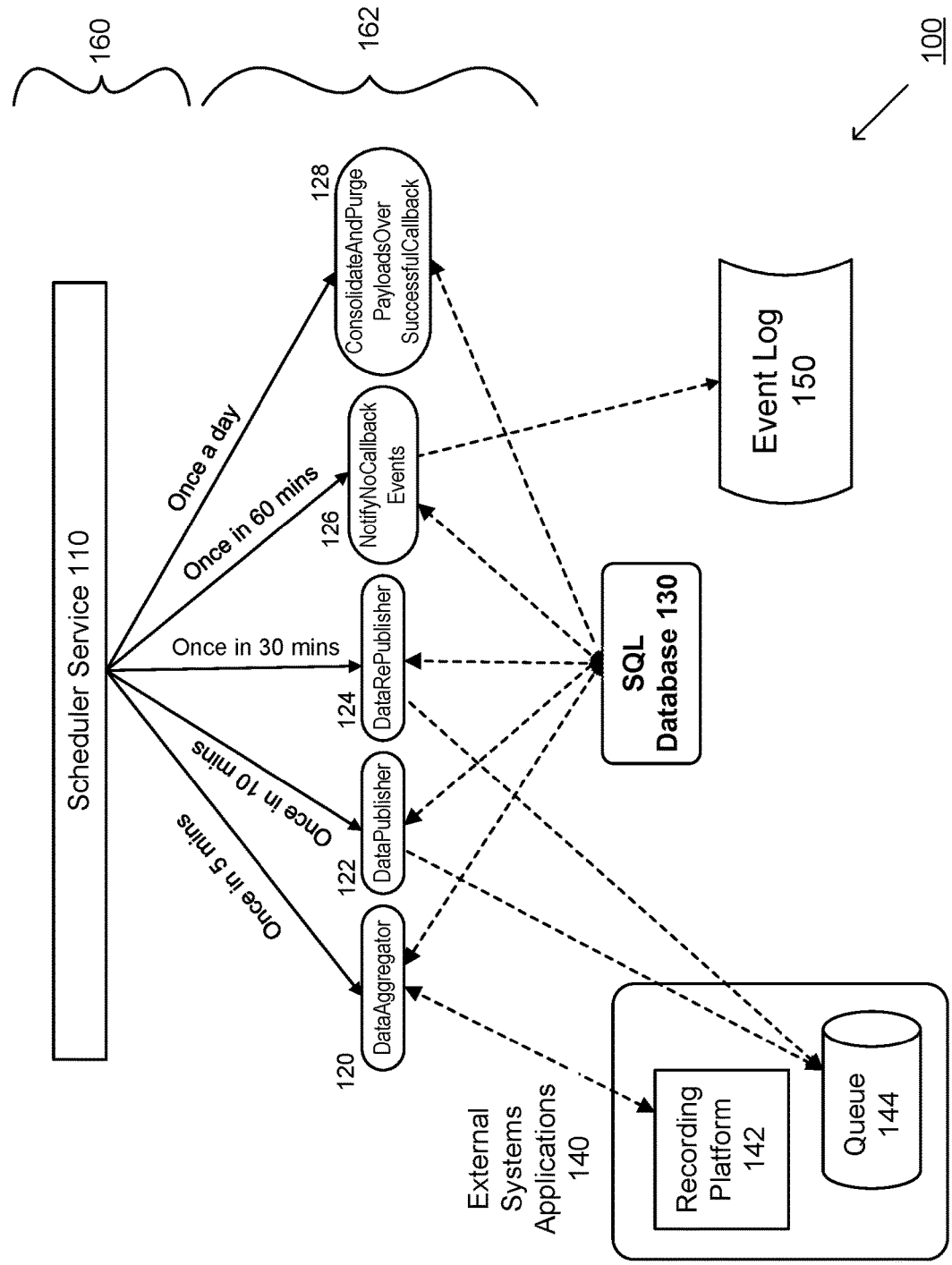
FIG. 1 is an exemplary illustration of an overall session tracker agent design pattern, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to large scale screen capturing on operating systems across global data center deployments. According to an exemplary embodiment, operating system log on session elevations requests may be routed and funneled through a set of jump host servers. Jump host servers may represent a system on a network used to access and manage devices in separate zones. For example, jump host servers may span multiple zones and provide access between or among multiple zones. According to an embodiment of the present invention, session monitoring tools may be deployed on the set of jump host servers to monitor and record key logging and recording to a centralized database. According to an exemplary implementation, an embodiment of the present invention may implement and execute on a set of 20 or so jump host servers, instead of all each and every server which could include tens of thousands of individual servers. The set of jump host servers may collect data from each of the individual servers. In this example, screen capturing is occurring from a jump host server that has access to individual servers. This provides observability into screen data without having to access each and every single device globally.

An embodiment of the present invention may implement a custom framework through which a notification and workflow process identifies who logged in, what activities are performed, when activities have ended, duration of the activities, etc. Other parameters, metrics and characteristics may be captured. The custom framework may be integrated with internal auditing teams and applications. An embodiment of the present invention may perform post reporting on audits. In addition, host servers may be enabled to replay recorded sessions for internal review on demand. Machine learning and artificial intelligence may be applied to the captured data for complex analytics, prediction, risk determinations, etc.

An embodiment of the present invention may be implemented in response to regulatory requirements. For example, requirements may involve capturing system activity for privileged access sessions and/or other sessions that give users certain controls, e.g., system administrator access, applications that grant privileges and various roles, etc. Requirements may mandate ensuring certain sessions to be monitored, recorded and made available for post activity.

An embodiment of the present invention may be directed to providing screen capture for remote desktop protocol sessions. For example, an entity may have tens of thousands of servers globally. According to an exemplary scenario, a user may access a server to temporarily secure a time-based privilege duration using just-in-time (JIT) technology. An embodiment of the present invention may capture such activity through large scale recording so that any activity performed by a user accessing the system, even globally, may be automatically collected, recorded and tagged.

An embodiment of the present invention is directed to implementing tagging capabilities to extract relevant screen images in real-time, correlate and aggregate the images on a backend event system and then make the data available to users, such as managers and other users based on access privileges. Accordingly, the managers may access content that is relevant and consistent with a corresponding role, privilege, access, confidentiality, etc.

An embodiment of the present invention may be applied to various operating systems and environments, including graphical interfaces (such as Microsoft Windows), non-graphical interfaces, command line interfaces or keystroke interfaces (such as Linux), etc.

FIG. 1 is an exemplary illustration of an overall session tracker agent design pattern, according to an embodiment of the present invention. The system of FIG. 1 may execute multiple agents, represented by 120, 122, 124, 126 and 128. Each agent may run a particular task. For example, each agent may run on different schedules that may be orchestrated by a scheduler service. Each agent may be triggered by an event, e.g., user interaction, and operate in an asynchronous mode. Here, the agents may run on a continuous basis to capture and extract the data triggered by events.

An embodiment of the present invention may capture data, aggregate the data across multiple agents, and publish the data to receiving teams, systems, applications, etc. An embodiment of the present invention seeks to interface the data to an associated data system publishing message. End users may then view the audit data and additional details, including hyperlinks to interact with actions based on ticket number, date, post and other key details of events. For example, hyperlinks may enable users to view playback video upon authentication and verification.

As shown in FIG. 1, Schedule Service 110 interacts with various software agents including Data Aggregator 120, Data Publisher 122, Data RePublisher 124, Notify No Callback Events 126 and Consolidate and Purge Payloads Over Successful Callback 128. Execution of the agents may occur in various intervals, according to a scheduler and/or other time period. For example, interactions with Data Aggregator 120 may occur once in 5 minutes. Interactions with Data Publisher 122 may occur once in 10 minutes. Interactions with Data RePublisher 124 may occur once in 30 minutes. Notify No Callback Events 126 interactions may occur once in 60 minutes. Interactions with Consolidate and Purge Payloads over Successful Callback 128 may occur once a day. Other variations and time schedules may be applied. The agents may access and/or store data to a database, e.g., SQL database 130. While a single database is shown for illustration purposes, additional database and/or other storage structures may be applied. The agents may also interact with external systems, e.g., External System Applications 140. In this example, External Systems Applications 140 may include recording platform 142 (e.g., Observe IT Eco Systems, etc.) and Queue 144 (e.g., messaging platform, etc.).

As shown by 160, Scheduler Service 110 may represent an internal custom scheduler service that gets plugged into a service (e.g., Windows service) so it continuously runs its assigned tasks. Each scheduler tasks may have its own dedicated settings that may be read from a file, e.g., an app.config file, by a specific key/value pairs. For example, this service may be set-up as part of a data service that may run under a middleware box. Other implementations may be supported.

As shown by 162, the exemplary agents may represent a console application (e.g., typically an .exe file) that gets called by one or more command line parameters, switches, etc. Switches may be internal and may represent different agents plugged in that get called or executed based on a type of switch that is passed. For example, agents may be designed to catch-up on a previous state/process from an intermediate runtime state, such as core runtime checks, validations, processing, etc. Each stage of operational validations/states may need to be persisted by applying operations, including CRUD operations representing create, read, update and delete. Data persistence of the runtime status/data may be exchanged with another external data service to facilitate persistence and data retrieval on demand. Accordingly, this facilitates other stages of the agents/processing pipeline to process the end to end requests.

Data Aggregator Agent 120 may extract and bind newly received session requests into a recording platform session, e.g., an Observe IT session matching. Agent 120 may communicate with External Systems Applications 140, through recording platform 142.

Data Publisher Agent 122 may extract and publish sessions bound with recording platform into a downstream messaging application (e.g., Kafka or other distributed streaming platform). Agent 122 may communicate with Queue 144. The recording platform may collect data from agents to capture user session data in real time to detect threats and other events. The application server may communicate with agents and deliver analytics and reports via a user interface (or dashboard).

Data RePublisher Agent 124 may extract and republish (as a second or subsequent time) on a periodic basis (e.g., every 12 hours) some or all sessions bound with the recording platform that were not acknowledged by downstream messaging application (e.g., Kafka) as a callback. Agent 124 may communicate with Queue 144.

NotifyNoCallBack Agent 126 may extract, on a periodic basis (e.g., for every 12 hours), some or all sessions bound with the recording platform that were not acknowledged by a downstream messaging application (e.g., Kafka) as a callback event (event after second or subsequent attempt). Agent 126 may notify a responsible team, recipient or receiving system for further actions. This Agent 126 may capture data and generate an Event Log 150.

After a successful callback agent, Consolidate and Purge Agent 128 may extract successful callbacks by a downstream app (e.g., per message) basis. The successful callbacks may be consolidated into a flat structure table as a master record. Transaction records may be decommissioned by purging from tables and keeping a final record for reporting.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

While a single component is illustrated in FIG. 1, each component may represent multiple components. In addition, multiple components may be integrated and/or otherwise combined. Other variations may be supported in accordance with the embodiments of the present invention.

Figure 2A:
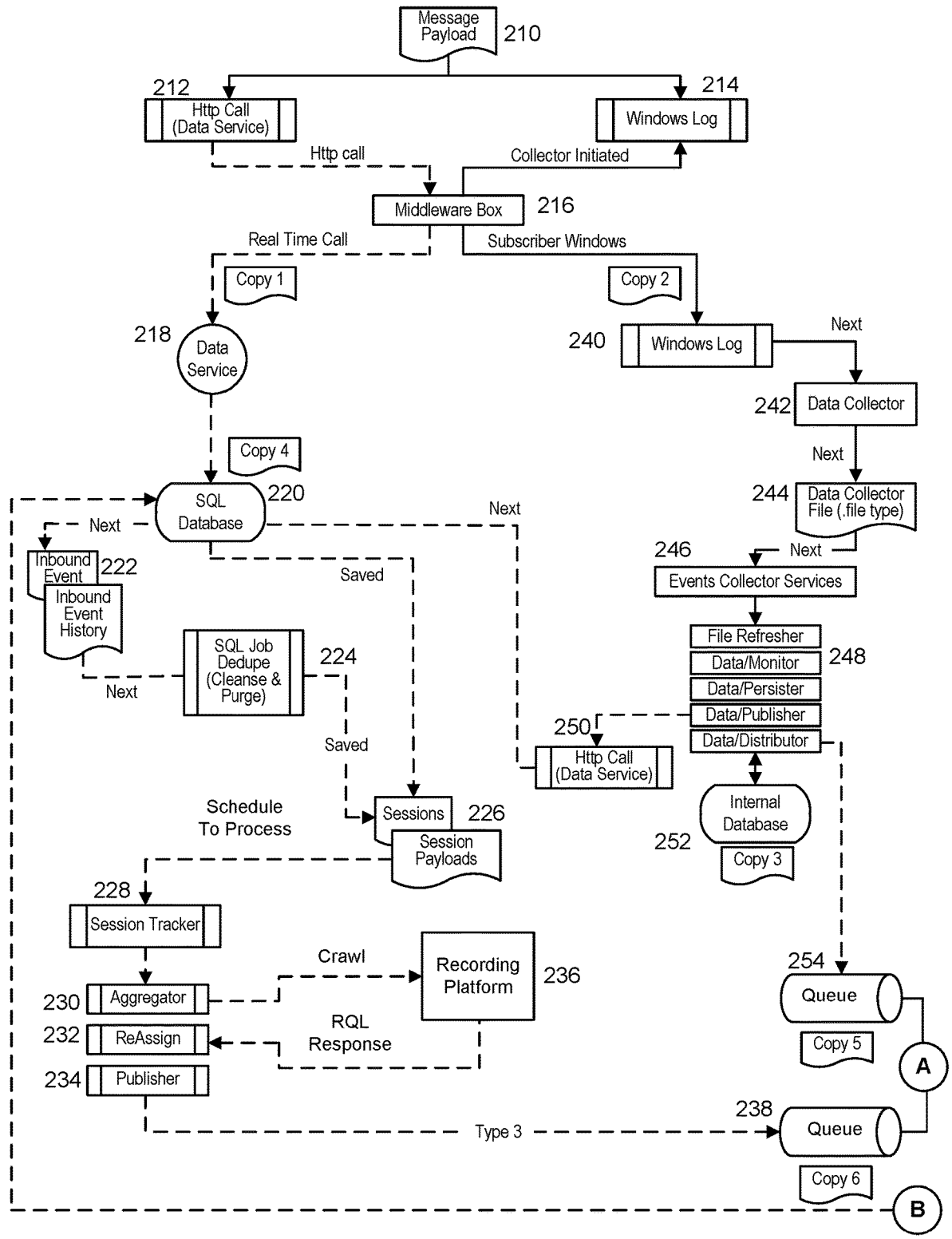
FIGS. 2A and 2B are an exemplary flow diagram that illustrates multi route logic, according to an embodiment of the present invention.
Figure 2B:
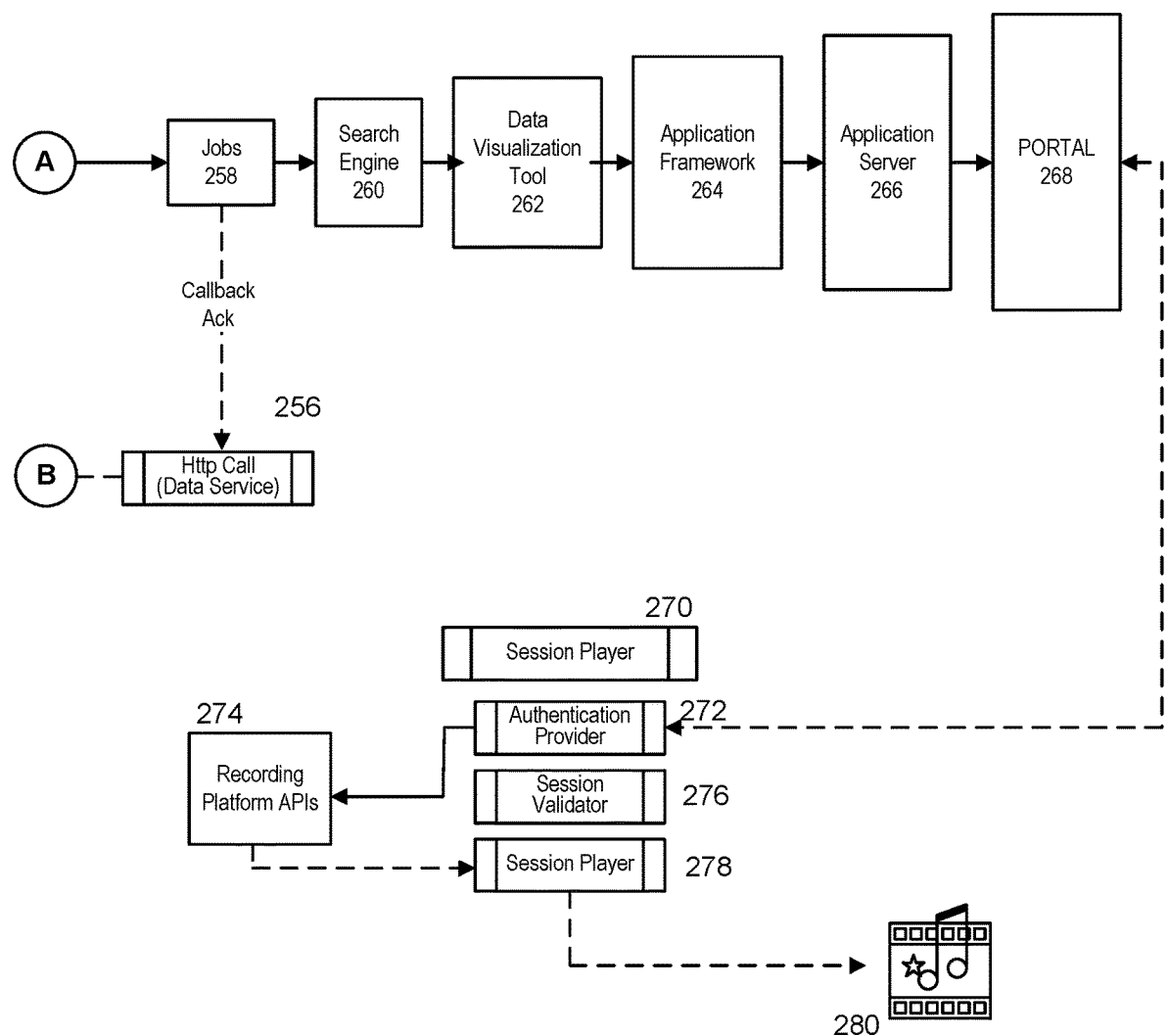

FIGS. 2A and 2B are an exemplary flow diagram that illustrates multi route logic, according to an embodiment of the present invention. The process of FIGS. 2A and 2B provides resiliency by making multiple routes available so that if one route fails, an alternative route may be invoked.

At step 210, a message payload may be received. The message payload may include event details, such as identifier, ticket, duration, host that is logging on, time of logon and other parameters. This may represent a triggering event for a session. Depending on the message payload, http call (e.g., data service) at 212 or windows log 214 may be initiated. Middleware Box 216 may lead to two separate flows. On the left side, a dedicated route may be used to direct web services. The right side is an alternative path that occurs when a web service fails at the time the message is ready to be published. A message may be replicated multiple times, e.g., four times, throughout the flow.

In the process of FIGS. 2A and 2B, a message may be replicated multiple times over. The data may flow to various ports of applications, such as an events collector. Other applications may seek to unify data when there are replicas of the data to support a potential failure. In the event of multiple replicas of data, a unifier may be applied in the events collector so that a single (non-duplicative) message may be published and sent to a downstream messaging application (e.g., Kafka bus).

Through a real-time call, Data Service 218 may receive Copy 1 of the message payload. SQL Database 220 may receive Copy 4. SQL Database 220 may generate Inbound Event History 222. SQL job deduplication (e.g., cleansing and purging data) may occur at 224. Data may be saved as Session Payloads 226. SQL Database 220 may also feed data to http Call (Data Service) at 250.

Session Payloads 226 may be scheduled to process via Session Tracker 228. Session Tracker 228 may initiate Aggregator 230, ReAssign 232 and Publisher 234. Aggregator may initiate a data crawl via Recording Platform 236 and return responses to ReAssign 232. Publisher 234 may send data to Queue 238, which may include Copy 6.

Middleware Box 216 may send Copy 2 to Windows Log 240 which communicates to Data Collector 242 (e.g., Winlog Beats, etc.) and generates or forwards Data Collector File 244 (e.g., Winlog Beats File (.file type)). Windows Log 240 may contain logs from an operating system and application. The logs may represent events that are happening on a computer, server and/or other device by a user or by a process. Data Collector 242 may represent a tool that sends event log data to a service. For example, Data Collector 242 may read from event logs using APIs, filter the events based on criteria and then send the event data to a configured output. Data Collector 242 may capture event data from various event logs, such as application events, hardware events, security events, system events, etc.

Next, Events Collector Services 246 may be initiated to perform functions 248 including File Refresher, Data Monitor, Data Persister, Data Publisher and Data Distributor. Data Publisher may initiate http call (data services) at 250. Data Distributor may access Internal Database 252 (which stores Copy 3). Data Distributor may send data to Queue 254, via Copy 5.

Copy 5 and Copy 6 may be received at Jobs 258 (as shown in FIG. 2B). Call back acknowledgement may be sent to http call (data service) at 256 and back to SQL Database 220 (as shown in FIG. 2A).

Messages may be filtered, mapped and published to a target, e.g., website, portal, etc. Jobs 258 may communicate to Search Engine 260, Data Visualization Tool 262, Application Framework 264, Application Server 266 and Portal 268.

Jobs 258 may represent data from a distributed streaming platform. Jobs may represent streams of records, recordings and/or other media.

Search Engine 260 may represent a distributed search and analytics engine for various types of data including text, numbers, geospatial, structure and unstructured. Search Engine 260 may run various queries against data and further use aggregations to retrieve summaries of the data. The data may be parsed, normalized and enriched before it is indexed. Other search engines and tools, including Elastic Search, may be applied.

Data Visualization Tool 262 may represent a visualization tool for data, dashboards and other interfaces. Data Visualization Tool 262 may provide real-time graphics, dynamic infographics, etc. Various data visualization tools may be applied, including Kibana Curl, for example.

Application Framework 264 may represent a comprehensive programming and configuration model for enterprise applications. Application Framework 264 may be considered a collection of sub-frameworks or layers and may further provide foundational support for different application architectures. Other frameworks may be applied, including Spring Framework, etc.

Application Server 266 may represent a Java servlet container that implements core enterprise specs. Various open source web server and servlet containers may be implemented, including Tomcat, for example.

Portal 268 may represent an interface that sends captured data in various formats to be accessed and/or presented by an intended recipient, team, system, application, etc.

Data stored may be played back or otherwise communicated via Session Player 270 through Authentication Provider 272, Session Validator 276, Recording Platform (e.g., Observe IT V2) APIs 274 and Session Player 278. Authentication Provider 272 may authenticate a user and confirm proper authorization. According to an exemplary illustration, Authentication Provider 272 may include OAuth Provider, for example. Session Validator 276 may check the session for validation. The output may be video file, represented by 280. Other mediums and outputs may be available.

For example, a manager or other user may view activities performed by team members. Here, the manager may view a team member's list of actions and then view graphics, videos and/or other media, including a playback of a video recording. The requesting user may also be authenticated prior to providing access to the media.

While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
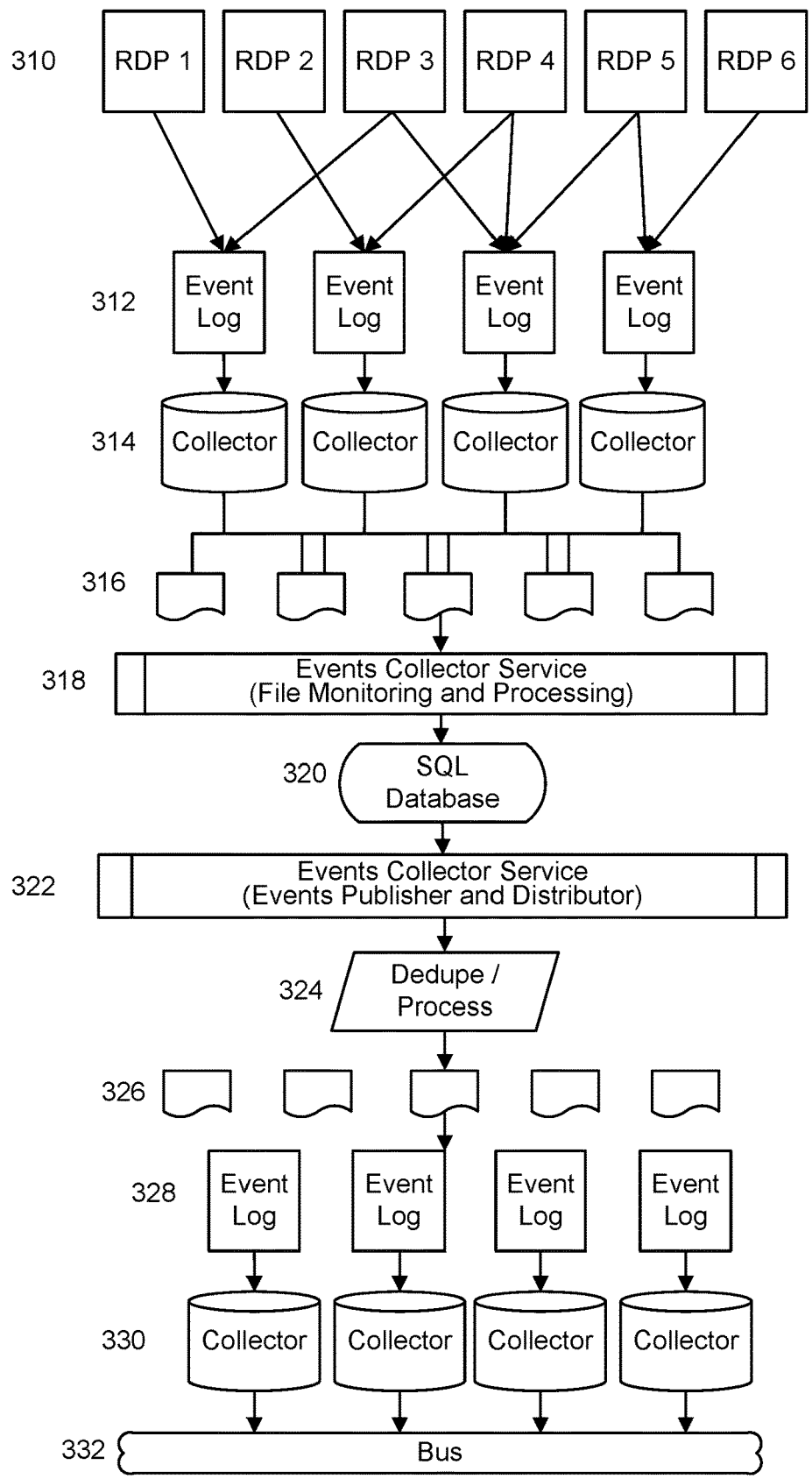
FIG. 3 is an exemplary diagram illustrating event collector design, according to an embodiment of the present invention.

FIG. 3 is an exemplary diagram illustrating event collector design, according to an embodiment of the present invention. FIG. 3 illustrates details relating to Events Collectors/Publishers in Middleware. As shown in FIG. 3, a set of devices that support remote desktop protocol sessions may be represented by 310. The set of devices may include remote desktop protocol (RDP) 1-6. Each device may generate an event log, as shown by 312. Event log data may be stored and managed in storage/collectors 314. For example, each message may be copied multiple times as shown by 316. Data may be sent to an Events Collector Service (e.g., file monitoring and processing service) 318. Data may be stored and managed by SQL database 320. From SQL database 320, events collector service may be applied at 322. This may include Events Publisher and Distributor. Deduplication process may be applied at 324. The output data 326 may be sent as Event Logs 328 to storage/collectors 330 and then Bus 332. Bus 332 may represent a messaging bus or other communication platform. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
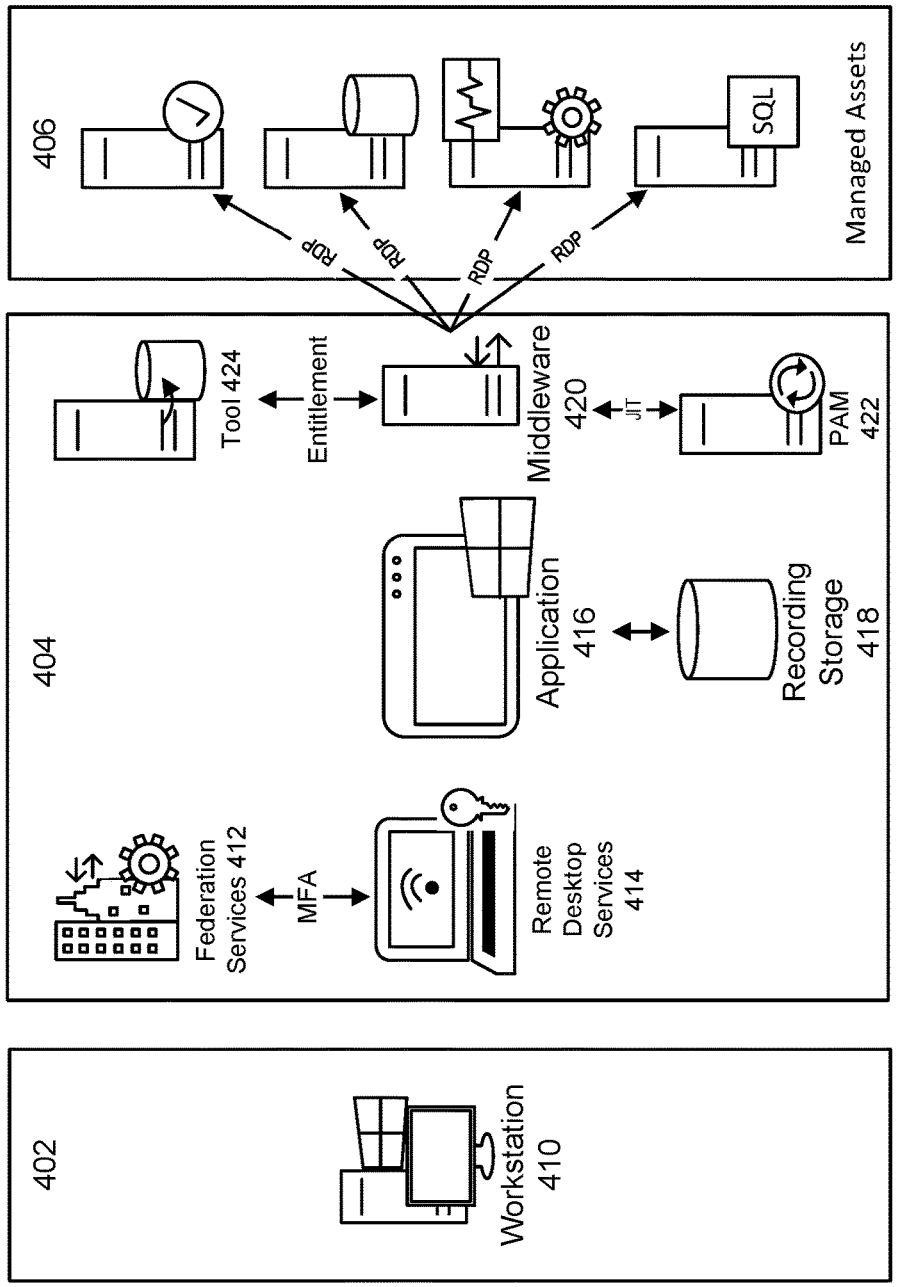
FIG. 4 is an exemplary system diagram, according to an embodiment of the present invention.

FIG. 4 is an exemplary diagram, according to an embodiment of the present invention. 402 and 406 represent an entity host. For example, 402 and 406 may represent a Tier 2, existing untrusted assets. 404 represents Tier 1, an active directory compartment assets. At 402, Workstation 410 may interface with a user. At 404, Remote Desktop Services 414 may execute on a user device. User device may interact with Federation Services 412, via multi-factor authentication (MFA). Remote Desktop Services 414 may execute Application 416 that accesses and stores recording data via Recording Storage 418. Application 416 interfaces with Middleware 420 that access entitlement data via a software engineering tool 424, e.g., *Verum*. Middleware 420 also interacts with Privileged Identity Management (PAM) 422. Middleware 420 may forward data to Managed Assets, via remote desk protocol (RDP). RDP provides a user with a graphical interface to connect to another computer over a network connection. Actions performed on the various Managed Assets via RDP may be captured at Middleware 420. An embodiment of the present invention may perform screen capture on graphical user interface applications. Another embodiment of the present invention may identify keystrokes and other interactions in a command line interface system.

FIG. 5 is an exemplary user interface, according to an embodiment of the present invention. As shown in FIG. 5, a user may view activities 510 associated with one or more team members. For example, activity may include interactions for a time period or other parameter. As shown by 510, metrics may include Period (e.g., time period), Login, Filter by endpoint, etc. Details may be provided at 520, which includes Session Duration, Login, User, Endpoint Name, Client Name, Slides, and Video. For example, by selecting a Video icon, a user may then view a playback of the selected activity. Other outputs may be captured and provided, including slides, images, text, summary, etc. Session details may be provided by date or other metric.

An embodiment of the present invention may be integrated with a just-in-time access application that provides just-in-time privileges across various systems. This real-time based application enables a user to simply request access to one or more servers for a predetermined period of time. For example, a user may request access for 30 minutes and once submitting the request (and upon approval), the requested access may be provided immediately for the next 30 minutes. On the backend, an active directory security group may be updated in real-time where the requesting user's credentials may be added and then at the end of the time period, the access may be promptly revoked. From here, the user may connect to the system and initiate access. An embodiment of the present invention may execute a screen capture agent that extracts data and enriches metadata. According to an exemplary illustration, a screen capture application may dynamically capture and manipulate (or update) tags as the user interacts with applications which may be across different hosts. In this case, the screen capture application may dynamically update unique identifiers. An event aggregation engine may use a unique identifier to contextualize which frames and recordings belong to which users. The event aggregation engine may then store and manage the collected information into a centralized review portal where time durations, frames and/or footage that are relevant to a particular user may be available for review.

An embodiment of the present invention may be directed to deploying a set of agents (e.g., around 20 agents) that then communicate with a whole platform of servers and systems (e.g., tens of thousands of servers). The set of agents may tag sessions in real-time and then make recordings and other forms of media available to specific authorized users. An embodiment of the present invention may be directed to contextualizing the data (e.g., frames, slides, etc.) by pulling, from the metadata, unique identifiers that were inserted into the graphical user interface. Accordingly, only captured data (e.g., frames, slides, etc.) that are related to a user's activity may be available for viewing and analysis.

An embodiment of the present invention may be directed to an interface that provides key member activity and data consumption. For example, a user (e.g., manager) may view activities associated with team members. An embodiment of the present invention is directed to recording sessions, identifying metadata, aggregating data and sending the aggregated data to a messaging queue (e.g., Kafka queue). Based on a unique tag (or identifier), a backend system may query and identify slides, events, video, text and other data captured by the screen capture recording application. Accordingly, the extracted data is associated with a session payload and corresponding user activity. When the requested information arrives at a backend system (e.g., portal), a user may interact with a link (e.g., URL) to access the captured data in various forms (as footage, video, slides, graphics, text, etc.) based on authorization and/or authentication.

Figure 6:
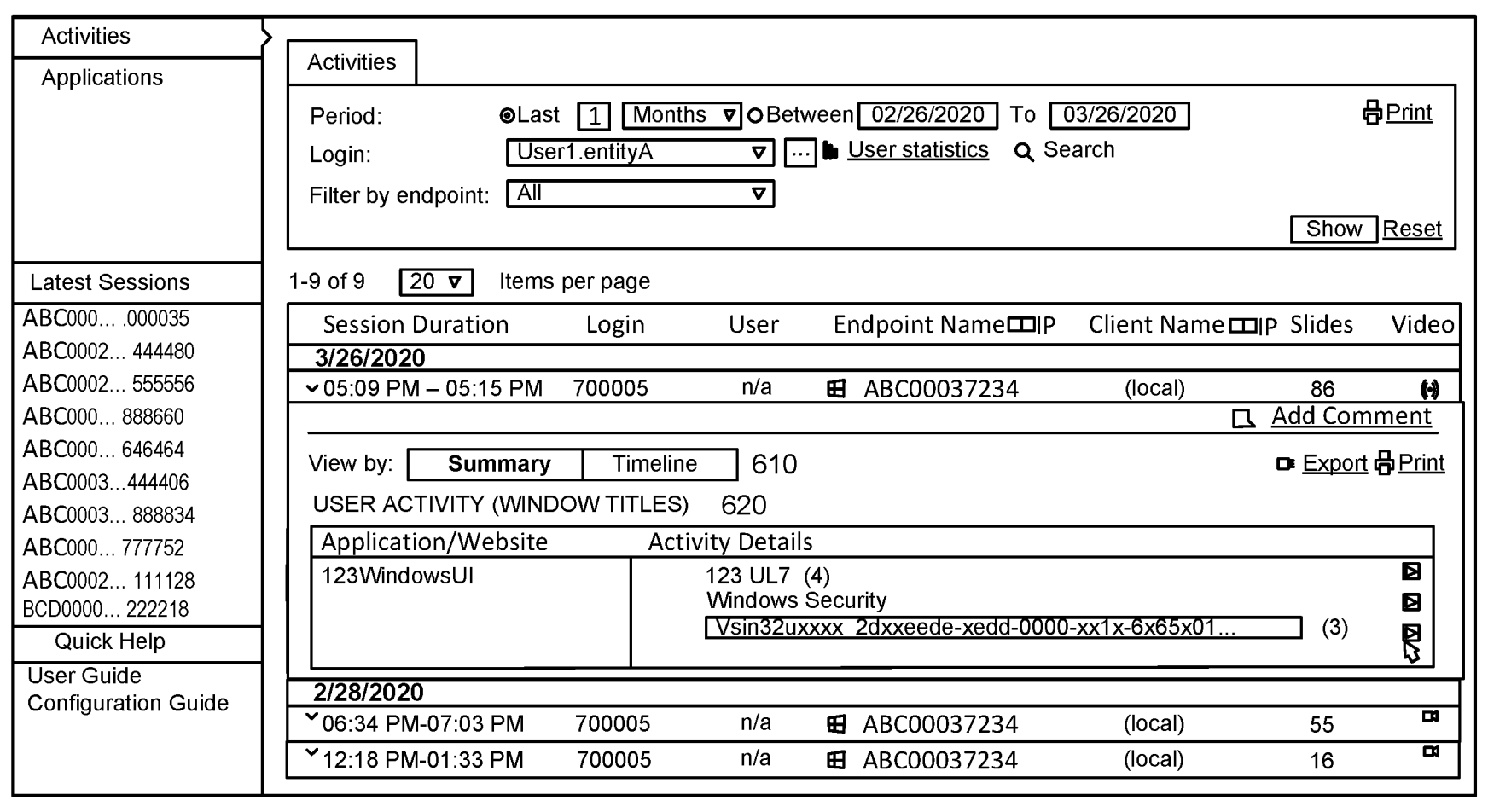

FIG. 6 is an exemplary user interface, according to an embodiment of the present invention. FIG. 6 illustrates additional details as shown by 610. Here, a user may view session details in various formats, including Summary or Timeline. Other graphics and outputs may be provided at 620. This may include Application/Website and Activity Details.

An embodiment of the present invention may apply machine learning and/or artificial intelligence to the extracted and captured data, which may include individual frames, images, graphics, text, etc. Other associated data may include time stamps, duration, ticket identifier, actor, etc. The associated data may also include activity performed on each slide, time period, text displayed and/or other parameter. An embodiment of the present invention may then analyze and perform decisioning on the extracted data.

An embodiment of the present invention may be directed to determining and/or assessing risk and other parameters. This may relate to managing privileged access to ensure users are performing authorized activities and not bypassing or exploring beyond assigned privileges and access and further identifying any deviations from approved access and behavior. Accordingly, an embodiment of the present invention may identify high risk activities from users by identifying deviations from authorized activities. This may then lead to automatically alerting when such activity is identified. Other activities may be detected and various alerts may generated.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that provides large scale screen capture, the system comprising:
   one or more processors;
   a memory storing one or more programs for execution by the one or more processors;
   a scheduler service that orchestrates a set of agents to execute at predetermined and disparate intervals, and on an asynchronous basis; and
   the set of agents, comprising a data aggregator agent, a data publisher agent, a data re-publisher agent, a notify no callback events agent, and a consolidate and purge upon successful callback agent,
   wherein the one or more programs when executed by the one or more processors implement the scheduler service and the set of agents,
   wherein the set of agents are configured to perform the steps of:
   capturing screen data in real-time from a corresponding set of servers in communication with a jump host server wherein the screen data corresponds to a unique identifier;
   identifying metadata associated with the screen data, wherein the metadata indicates logon details;
   aggregating, via a centralized backend event system, the screen data;
   publishing the data to a messaging queue; and
   in response to an authenticated request, providing the published data from the messaging queue via a playback platform.

2. The system of claim 1, wherein the authenticated request is based on a requesting user's privileges.

3. The system of claim 1, wherein the screen data comprises graphical data from a graphical interface operating system application.

4. The system of claim 1, wherein the screen data comprises keystroke data from a command line interface based operating system application.

5. The system of claim 1, wherein the screen data is captured via remote desktop protocol sessions.

6. The system of claim 1, wherein the published data comprises a video playback.

7. The system of claim 1, wherein the published data comprises a set of slides.

8. The system of claim 1, wherein machine learning is applied to the aggregated screen data for one or more risk determinations.

9. A method that provides large scale screen capture, the method comprising the steps of:
   executing a scheduler service that orchestrates a set of agents comprising a data aggregator agent, a data publisher agent, a data re-publisher agent, a notify no callback events agent, and a consolidate and purge upon successful callback agent, to execute at predetermined and disparate intervals, and on an asynchronous basis;
   capturing screen data in real-time from a corresponding set of servers in communication with a jump host server wherein the screen data corresponds to a unique identifier;
   identifying metadata associated with the screen data, wherein the metadata indicates logon details;
   aggregating, via a centralized backend event system, the screen data;
   publishing the data to a messaging queue; and
   in response to an authenticated request, providing the published data via a playback platform.

10. The method of claim 9, wherein the authenticated request is based on a requesting user's privileges.

11. The method of claim 9, wherein the screen data comprises graphical data from a graphical interface operating system application.

12. The method of claim 9, wherein the screen data comprises keystroke data from a command line interface based operating system application.

13. The method of claim 9, wherein the screen data is captured via remote desktop protocol sessions.

14. The method of claim 9, wherein the published data comprises a video playback.

15. The method of claim 9, wherein the published data comprises a set of slides.

16. The method of claim 9, wherein machine learning is applied to the aggregated screen data for one or more risk determinations.

* * * * *